Jan. 14, 1969 P. A. KANE 3,421,231
ELECTROKINETIC TUTORING MEANS
Filed Jan. 6, 1967 Sheet 2 of 3
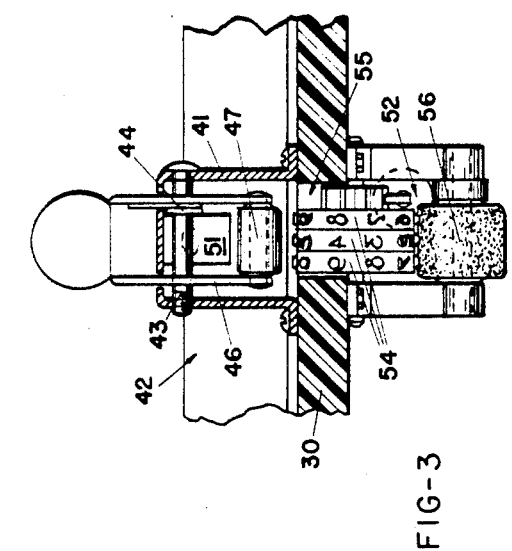
FIG-3
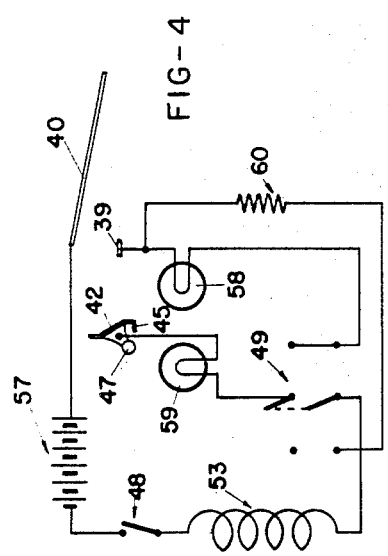
FIG-4
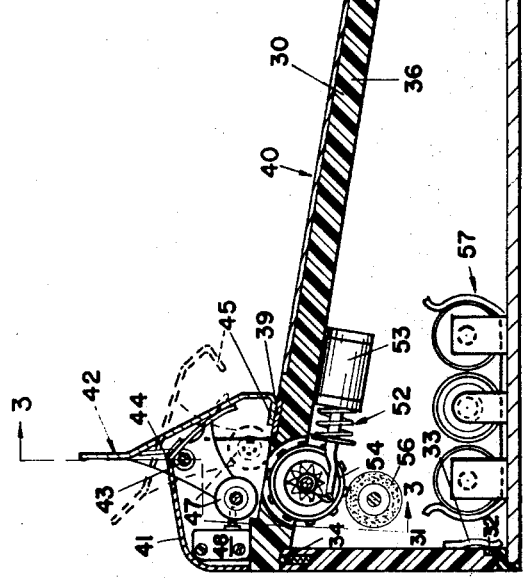
FIG-2
INVENTOR,
PATRICK A. KANE

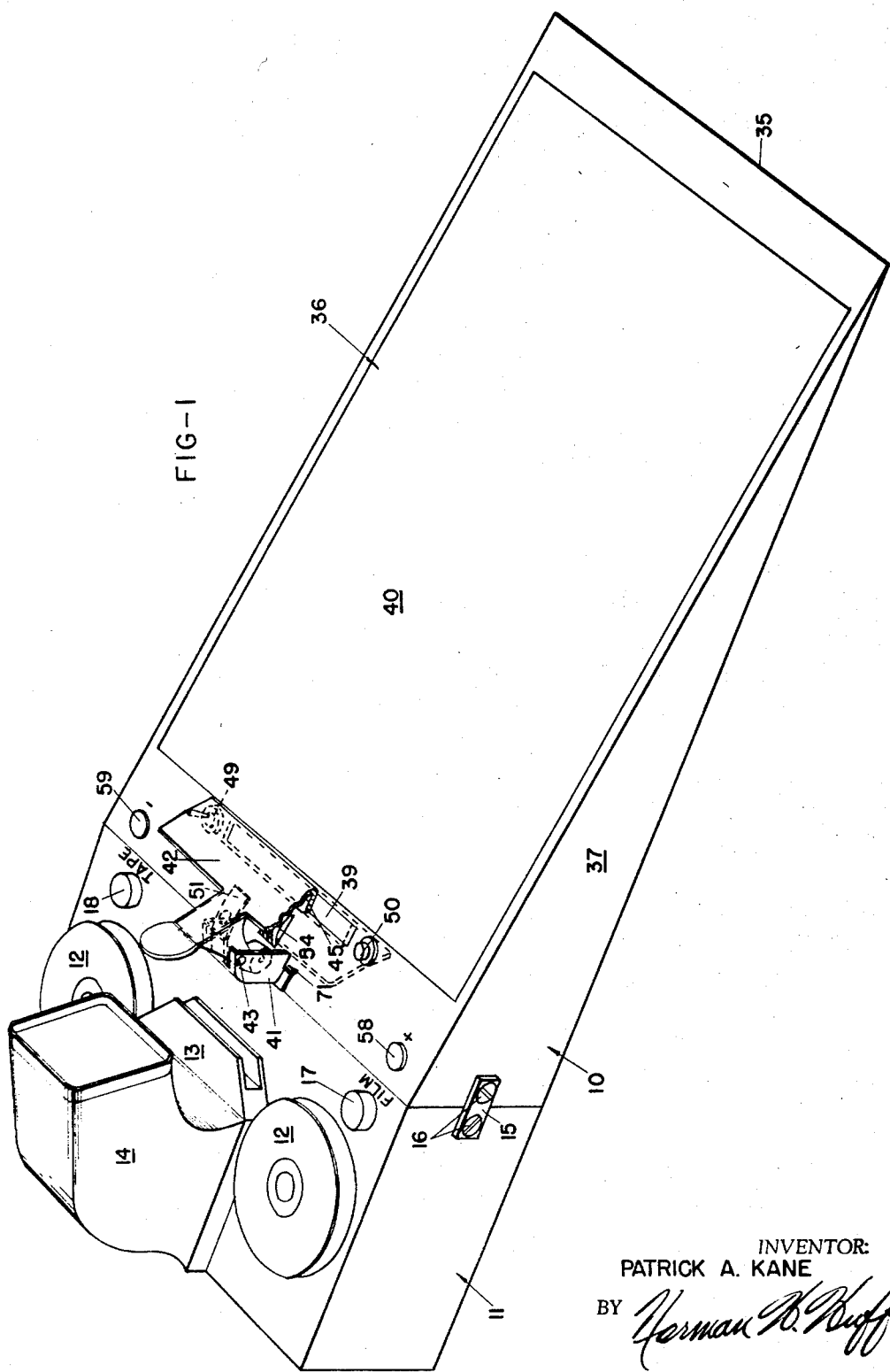

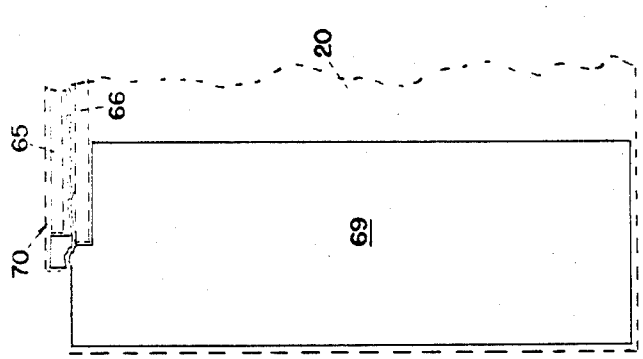
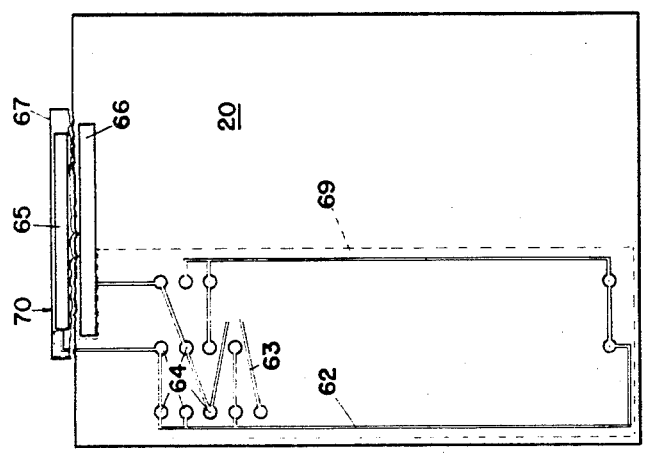
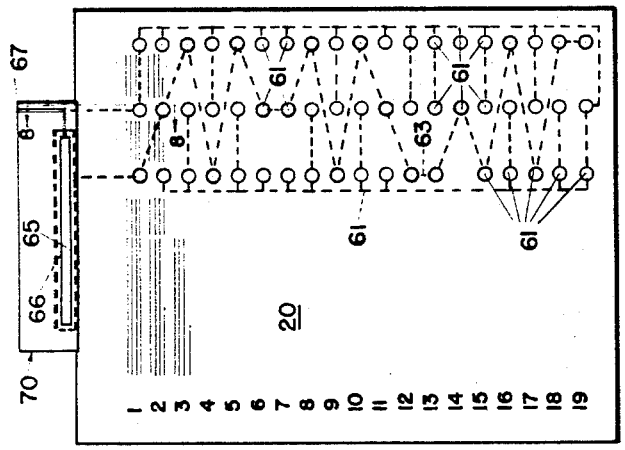
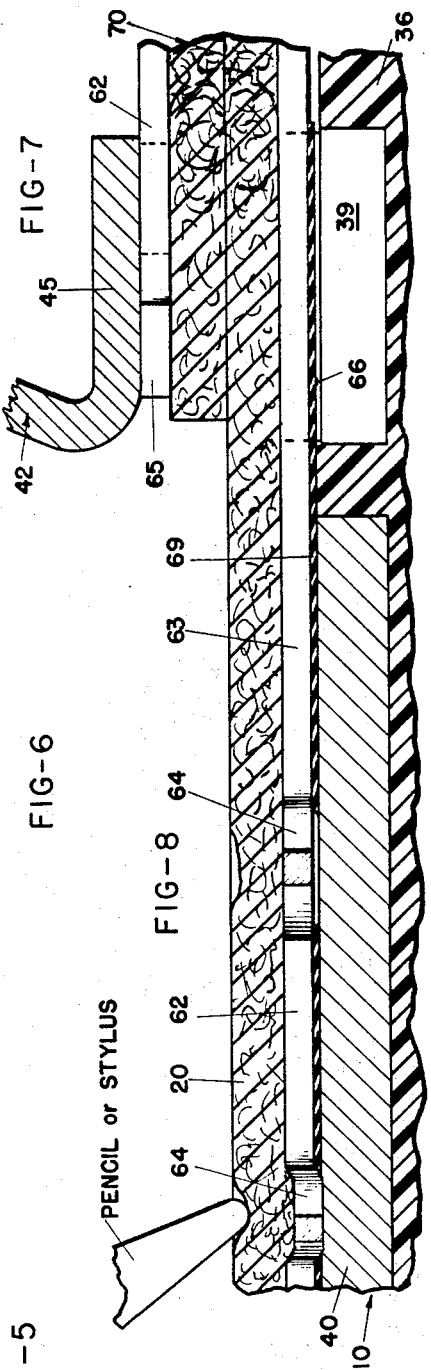
INVENTOR:
PATRICK A. KANE

United States Patent Office 3,421,231
Patented Jan. 14, 1969

1

3,421,231
ELECTROKINETIC TUTORING MEANS
Patrick A. Kane, Hartline, Wash. 99135
Filed Jan. 6, 1967, Ser. No. 607,802
U.S. Cl. 35—9     8 Claims
Int. Cl. G09b 7/00

ABSTRACT OF THE DISCLOSURE

An electrically powered teaching implement including circuits adapted to energize a digital read-out device alone or selectively said digital read-out device and indicator lights showing "correct" and "incorrect" answers; and drill and test papers having electrical circuits thereon and adapted for use with said implement.

My present invention relates broadly to the field of education and more specifically to apparatus designed to facilitate the teaching and learning process and particularly to an electrically powered device and specially constructed sheets for use by students during instructive drills and tests.

One of the most time consuming duties of a teacher is to examine, correct and grade papers containing the work of each individual pupil. This necessitates his reading and analyzing every written answer, or carefully checking each of the "True or False" checks or "Multiple Choice" checks on every paper. To reduce the work load this imposes, teachers often have their pupils exchange papers for correcting, but then are faced with incorrect grading because of incapacity of the student to properly understand the answers of their peers or wilfully being over lenient or harsh because of social pressure or outright dishonesty.

For the foregoing reasons it is preferred that the instructor grade the papers of all of his pupils but often, time will not permit him to do so efficiently.

My present invention is designed to materially improve this situation by eliminating the possibility of human error or deliberate falsehood and also grades the test simultaneously with the pupils' marking the test paper.

It is also designed to be used during instruction drills so that the student may know immediately when his answer is incorrect and may ponder the correct answer while the subject is still uppermost in his mind and thus learn the correct information rapidly and retain it better. It also permits timely review with the teacher for the said improved results.

It is therefore an object of my present invention to provide a tutoring device which will sense and record each time a pupil marks a correct answer on a drill or test.

It is another object of my present invention to provide means, selectively actuable, for displaying to the student each correct and incorrect answer at the time it is marked during informative drills and also recording the number of marks made thus showing the number of total attempts made to find the correct answers.

Yet another object of my invention lies in the provision in said tutoring device of an electrokinetic impulse recorded having indicia thereon and means for transferring the information at the close of the test or drill session to the sheet upon which the student marked his answer.

A still further object of the invention lies in the provision of a tutoring implement to be used in conjunction with the foregoing device which is a pressure-deformable sheet having a conductor circuit associated therewith so that marking pressure on the face thereof will deform the sheet sufficiently to displace the conductor from its normal position.

2

It is yet a further object of my invention to provide a second conductor circuit associated with said sheet and each said circuit being such as to physically correspond at the back of the sheet with respect to the check-mark areas on the front of the sheet categorized as "correct" or "incorrect" answers.

Another object of the invention is to provide a contact associated with each conductor circuit adapted to correspond with a contact on said device to effect closing of selected circuits in said device as said sheet is deformed by marking the said check-mark areas.

Yet a further object of the invention lies in the provision of a pressure-dispersable non-conductive film covering said conductor circuits to preclude electrical union with other circuit elements except when pressure is applied in the said check-mark areas.

These and other important objects and advantages of the present invention will become more apparent and meaningful during the course of the following specifications when considered in association with the accompanying drawings wherein a preferred form of the invention is graphically illustrated. It is to be understood, however, that the drawings are illustrative only and are not intended to limit the scope of the invention. It should also be understood that various changes and alterations in construction and arrangement of parts may be resorted to in the course of manufacture without in any way departing from the spirit of the invention, which is to be understood only in accordance with the appended claims. Furthermore, it should be recognized that while the invention is described in one particular field of utility, it is not my intention to necessarily so limit the applicability of the invention but I desire to reserve to myself the claimed invention for every use of which it is now known, or subsequently discovered, to be susceptible.

The more detailed description following, refers by reference numerals, to the several views in the accompanying drawings wherein like numerals designate like parts throughout the several views. In the drawings:

FIGURE 1 is a perspective view of my improved tutoring device with the drill or test sheet removed and parts broken away to show the contacts more clearly;

FIGURE 2 is a longitudinal vertical cross section through the device of FIGURE 1;

FIGURE 3 is an enlarged fragmentary vertical section taken substantially on the planes indicated by lines 3—3 of FIGURE 2;

FIGURE 4 is a schematic wiring diagram of the circuits associated with the device;

FIGURE 5 is a plan view of a test or drill sheet folded and ready to be received by the device of FIGURES 1 through 4;

FIGURE 6 is a back plan view of said sheet having portions broken away and the insulative film shown in dotted lines;

FIGURE 7 is a view similar to FIGURE 6 but showing said film in full line and the sheet in dotted lines with portions broken away; and FIGURE 8 is a greatly enlarged vertical section of the sheet and device associated for interaction and showing substantially that longitudinal section indicated by line 8—8 of FIGURE 5.

Reference numeral 10 is employed to designate the rigid table portion of the device as seen in FIGURE 2. Releasably secured to the table portion 10 I provide a header 11 which carries a tape play-back unit, the reels and head of which are designated by numerals 12 and 13 respectively. A motion picture or film strip viewer 14 is also carried by the header 11. The header 11 is releasably secured to the table 10 in any practical manner as by rigid bars 15 and screws 16. Light and/or power switches 17 and 18 are provided to facilitate manual control of these mechanisms. The information contained upon the tapes and films (not shown) would be correlated to the indicia printed or otherwise applied to the corresponding drill or test sheet 20 (FIGURES 5–8).

The table 10 has a rigid frame 30 preferably, though not necessarily, formed from a non-conductive material; for example, one of the well known plastics. It has a rear wall 31 which is removably secured in an access opening 32 by means of overlapping fingers 33 and a biased detent 34. The frame 30 tapers toward its forward edge 35 and presents an inclined planar table 36 as a writing table or surface. The triangular side walls 37—37 and the removable bottom wall 38 complete the basic frame unit.

Imbedded in the upper surface of the table 36 are first and second contacts 39 and 40. The contacts are formed of a conductive material such as copper, brass, steel, aluminum and such like and the first contact 39 is an elongated bar extending laterally of the direction of incline and slightly spaced and electrically insulated from the second contact 40. This second contact 40 is a plate which substantially covers the table 36 and serves as the actual support surface for the writer.

Secured to the table 36 at its rear marginal edge portion is a bracket 41 which pivotally supports a clamp member 42 journaled on the shaft 43 about which torsion spring 44 is disposed with its ends impinging against the bracket 41 and the clamp member 42 to yieldably bias the clamp member 42 toward clamping engagement of its third contact 45 bar with the contact 39.

Carried by the clamp member 42 is a radial arm 46 which rotatably supports at its free end a pressure roller 47.

A normally open switch 48 is fixed to the bracket 41 and is actuated by the position of the roller 47. When the clamp 42 is in its normal position the roller 47 actuates the switch to its closed position and when the clamp 42 is tilted, the roller moves forwardly in an arc away from the switch 48 and the switch opens.

The third contact 45 is shorter than the lateral dimension of the clamp 42 so that D.P.D.T. switch 49 and recorder reset button 50 may be covered by said clamp and thus be inaccessible to manual actuation while the clamp is in its normal clamping position.

A noise-maker 51, for example a shaped leaf spring commonly called a "cricket" is secured to the bracket 41 and is actuated when the clamp is moved from its normal position (full line FIGURE 2) to its open position (dotted line FIGURE 2).

An electrokinetic impulse recorder 52 having an activating solenoid 53 constructed and arranged to advance the embossed recorder wheels 54 one digit for each impulse as is now well known in digital read-out devices, for example as in timing and counting devices, is fixed to the underside of said table 36 and the recorder wheels 54 protrude through an aperture 55 to the top surface of the table 36. Inking roller 56 transfers ink to the embossed numbers on the wheels as they are advanced one digit at a time.

A source of electrical power 57, here shown to be batteries, but which may be any one of the well known sources, is contained within the rigid table frame 10, and is incorporated into the circuitry as shown in FIGURE 4.

Inspection of FIGURE 4 will reveal that the tutoring device table portion 10 has a normally open circuit which, proceeding from the contact 40 has the electrokinetic source 57, normally open switch 48, impulse recorder solenoid 53, and D.P.D.T. switch 49 connected in series. From the switch 49 there are parallel leads each of which includes visual indicator light as 58 or 59 and thence connects to its respective contact 39 or 45.

When switch 49 is disposed to the right as seen in FIGURE 4, electrically connecting contact 40 with either contact 39 or 45 will light its respective light 58 or 59 and simultaneously energize the solenoid 53.

When the switch 49 is disposed to the left, the lights are both open circuited at switch 49 and the compensating resistor 60 is brought into the circuit in series between the solenoid 53 and the contact 39. When the source 57 is approximately 8 volts and 6 volt lights are used at 58 and 59 the resistor 60 calculates to be about 40 ohms to provide the same electrokinetic power in the solenoid.

The drill or test sheets 20 comprise a body of non-conductive opaque material, for example, paper, upon the face of which is printed or otherwise presented indicia to be used in the drill or test. I have shown a drawing depicting questions having multiple choice answers (here three), and the answers are to be indicated by putting a single mark, as for example a diagonal (/) line through the marking area 61. There will be, of course, two categories of answers, i.e. "correct" and "incorrect."

By printed circuit or otherwise, each check-mark area 61 in each category will be associated at the back side of the sheet where it is not visible from the front, and on the same paper or another if desired, with a single conductor 62 or 63 having enlarged areas 64 corresponding to the check-mark areas 61 as dictated by the correct and incorrect categories. At one end each conductor 62 and 63 terminates in a contact 65 or 66 respectively. Contacts 65 and 66 are electrically and physically separated from each other and when the sheet 20 is folded at 67 they can be disposed one about the other as seen in FIGURES 5 and 8 with the folded sheet 20 therebetween. When the sheet 20 is placed upon the table 36, contact 66 is disposed upon contact 39 and when clamp 42 is released contact 45 impinges against contact 65 and clamps the sheet 20 against removal and insures electrical connection of the said contacts.

The conductor circuits 62 and 63 are superposed with respect to contact 40 but contact is precluded by an extremely thin film of non-conductive pressure dispersible film. I have found that a thin coat of rubberized cement 69 works very effectively but thin coats of harder materials such as varnish and shellac will be effective also. Any material which is non-conductive and can be displaced by pressure or punctured with a pointed stylus will suffice.

The material 69 or the sheet 20 should be resilient enough to spring back and break connection when the pressure is released or the point withdrawn. Most papers with 16 or 20 pound weight are capable of so doing. When other paper is used, the film 69 may be selectively adapted. For example, the rubber cement functions properly irrespective of the weight of the paper.

*Operation*

With the impulse recorder 52 reading 0 a sheet 20 is applied under the clamp with contacts 66 and 39 superposed and also contacts 45 and 65. The folded extension 70 extending over the digital wheels 54 of the counter and into the slot 71 (FIG. 1). With switch 49 in the test position (left in FIGURE 4) only marking correct answers will complete the circuit through solenoid 53 and thus only correct answers will be recorded. When the test is completed manually tilting the clamp 42 will cause roller 47 to move forwardly and the extension 70 upon the embossed wheels 54 thus transferring the information from the impulse recorded 52 onto the sheet 20 providing an instantaneous grade for the test.

With switch 49 in the right hand position and a drill sheet applied, both correct and incorrect answers will actuate the impulse recorder, but lights 58 and 59 will light to indicate whether the answers are correct or incorrect. The student may successively mark answers which appear likely to be correct in his view until the actual correct answer is located and thus learn therefrom.

Upon removal of the sheet 20 the total number of attempts made will be marked from the impulse recorder 52 as aforesaid and this number divided into the total number of questions will give the student a mathematical grade proportional to his accuracy in marking correct answers.

Having thus described my invention, I desire to secure by Letters Patent of the United States, the following:

1. A tutoring device, comprising:
   a normally open electrical circuit including:
   an electromotive source,
   an electrokinetic impulse recorder, and
   a first and second contact at the ends of said circuit;
   a non-conductive pressure-deformable sheet, said sheet having an electrical conductor attached to the surface thereof electrically contacting said first contact and superposed with respect to said second contact; and
   a pressure-dispersible resilient non-conductive film attached to said sheet, said film normally insulating said conductor from said second contact except when pressure is applied to said sheet above said film to effect displacement of said film and effect electrical contact between said conductor and said second contact to close the normally open circuit and energize said impulse recorder.

2. The invention defined in claim 1 and further characterized by:
   said circuit operably incorporating an electrokinetic visual indicator.

3. The invention defined in claim 2 and further characterized by:
   a second normally open circuit including:
   a third contact electrically connected to said first-named circuit parallel to said second contact and in series with said source, recorded and second contact, and operably incorporating another electrokinetic visual indicator;
   and said sheet having a second conductor electrically contacting said third contact and superposed and insulated with respect to said second contact as aforesaid.

4. The invention defined in claim 1 and further characterized by:
   said impulse recorder having indicia thereon; and means for transferring an impress of said indicia to said sheet.

5. The invention defined in claim 3 and further characterized by:
   a rigid frame;
   said second contact being a plate on said frame and presenting a planar surface adapted to underlie said sheet and serve as a writing surface;
   said first contact being a flat bar disposed at one edge of said plate and insulated therefrom; and
   said third contact being a spring biased clamp having a conductive pressure bar disposed above said first contact, whereby to clamp said sheet therebetween and insure electrical connection between the selective contacts.

6. A tutoring implement, comprising:
   an opaque non-conductive pressure-deformable sheet;
   at least two conductors fixed on the back side of said sheet and indistinguishable from the front side;
   indicia visible from the front side of said sheet and having defined categorical check-mark areas only selected ones of which are superposed with respect to said conductors; and
   each said conductor terminating in a contact on said sheet spaced with respect to the other perpendicularly with respect to one edge of said sheet, whereby an acute fold of said sheet between said contacts away from each other, parallel to said edge, will dispose said contacts at opposite sides of said sheet.

7. An invention in accordance with claim 6 and further characterized by:
   a thin pressure-dispersible resilient non-conductive film overlaying said conductors but not overlaying said contacts.

8. A tutoring implement, comprising:
   an opaque non-conductive pressure-deformable sheet;
   at least one linear conductor fixed on the back side of said sheet and indistinguishable from the front side;
   indicia visible from the front side of said sheet and having defined categorical check-mark areas only selected ones of which are superposed with respect to said conductor; and
   a thin pressure-dispersible resilient non-conductive film overlying said conductor.

References Cited
UNITED STATES PATENTS

| | | | |
|---|---|---|---|
| 2,997,793 | 8/1961 | Kelly | 35—9 |
| 3,100,352 | 5/1963 | Boissevain | 35—9 |
| 3,106,027 | 10/1963 | Thelen | 35—9 |

EUGENE R. CAPOZIO, *Primary Examiner.*

WALTER W. NIELSEN, *Assistant Examiner.*